March 9, 1954   M. H. SCHEITER   2,671,359
FIVE-SPEED COMPOUND PLANETARY GEAR
Filed Dec. 6, 1947   2 Sheets-Sheet 1
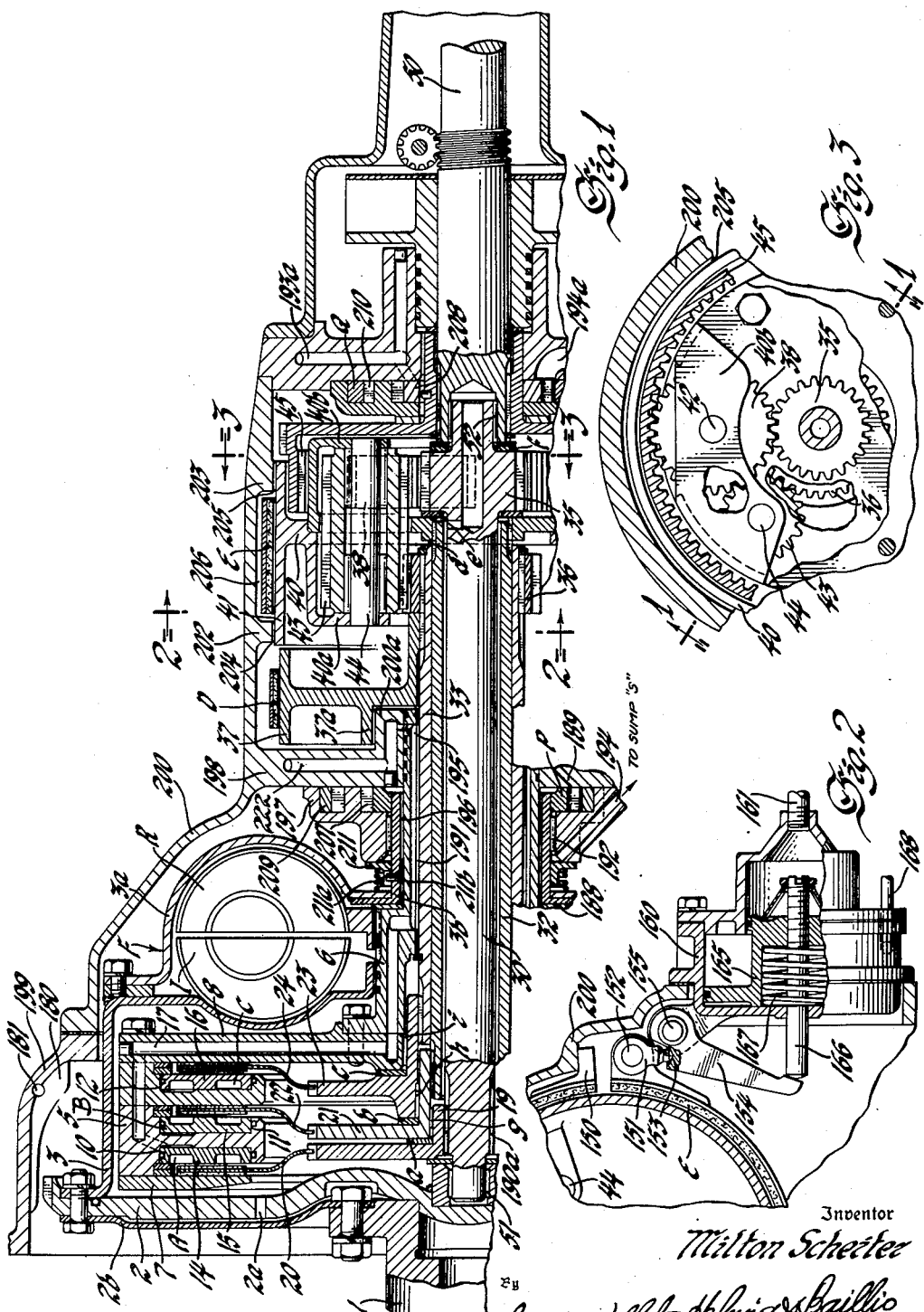
Inventor
Milton Scheiter
By
Spencer, Willits, Helwig & Baillio
Attorneys March 9, 1954 — M. H. SCHEITER — 2,671,359
FIVE-SPEED COMPOUND PLANETARY GEAR Filed Dec. 6, 1947 — 2 Sheets-Sheet 2

INVENTOR
Milton Scheiter
BY
ATTORNEYS

Patented Mar. 9, 1954

2,671,359

UNITED STATES PATENT OFFICE 2,671,359

FIVE-SPEED COMPOUND PLANETARY GEAR

Milton H. Scheiter, Dearborn, Mich., assignor to General Motors Corporation, Detroit, Mich., a corporation of Delaware Application December 6, 1947, Serial No. 790,118

17 Claims. (Cl. 74—730)

1

The present invention pertains to special forms of compound planetary gear trains having plural input clutch members arranged to be coupled to engine power by fluid turbine devices.

It pertains more particularly to such forms of gearing in which there are intermeshed plural planet gears mounted on a common carrier, which carrier may serve both as a reaction member and an engine torque coupling means, and in which output torque is delivered by an annulus gear driven by one of the intermeshed planet gears for speed ratios below unity.

It likewise pertains to such forms of gearing with multiple input clutches in which there are input clutches for each of two sun gears, one of which may be reaction braked, the sun gears meshing with different planet gears.

It further specifically pertains to such gearing combinations in which there are three input clutches, one carrier-connected, the other two being sun gear connected, by which five different speed ratios are obtained between transmission input and output members.

The arrangement described in detail herein, is of further specific conformation in the combining of a common input member for the aforesaid three clutches with a driven member of a fluid turbine device having an input impeller driven by the engine or prime mover. This device provides ranges of ratio in accordance with its speed and instantaneous torque capacity.

It is an object of the invention to provide a compound planetary gearing assembly with plural input clutches wherein the clutches and the aforesaid fluid turbine device are separately compartmented and while utilizing a common fluid body, one portion is kept under predetermined pressure, while the other is relieved to atmosphere or is at sump pressure. It is desirable that the turbine device operate under a predetermined pressure, while the clutch compartment operate without pressure from the pump. The arrangement provides a saving in volumetric space over competitive arrangements, and also certain economies in structure.

It is a specific object of the invention to provide a compound planetary gear construction of highly compact form, wherein an annulus gear is the transmission output member including within its flanking radial planes a primary sun gear and a planet gear meshing with both, supported on a carrier located oppositely to the web of the said output annulus gear, the carrier also supporting forwardly of its web a second planet gear meshed with the first, and also meshed with

2 a reaction sun gear, the sun gear and carrier elements being adapted for individual power connection.

Further and additional objects, provisions and advantages will be apparent in the following specification description in which:

Figure 1 is a vertical longitudinal view in part section of a transmission assembly embodying the features of invention noted above.

Figure 2 is a part section taken at 2—2 of Fig. 1 to disclose the method of fluid pressure actuation for one of the ratio-determining brake bands to provide a reduction drive.

Figure 3 is a part section taken at 3—3 of Fig. 1 to show the arrangement of the gear elements of the transmission.

Figure 1 shows the vertical, longitudinal section of a transmission assembly utilizing the teaching of the present invention.

Figure 4:
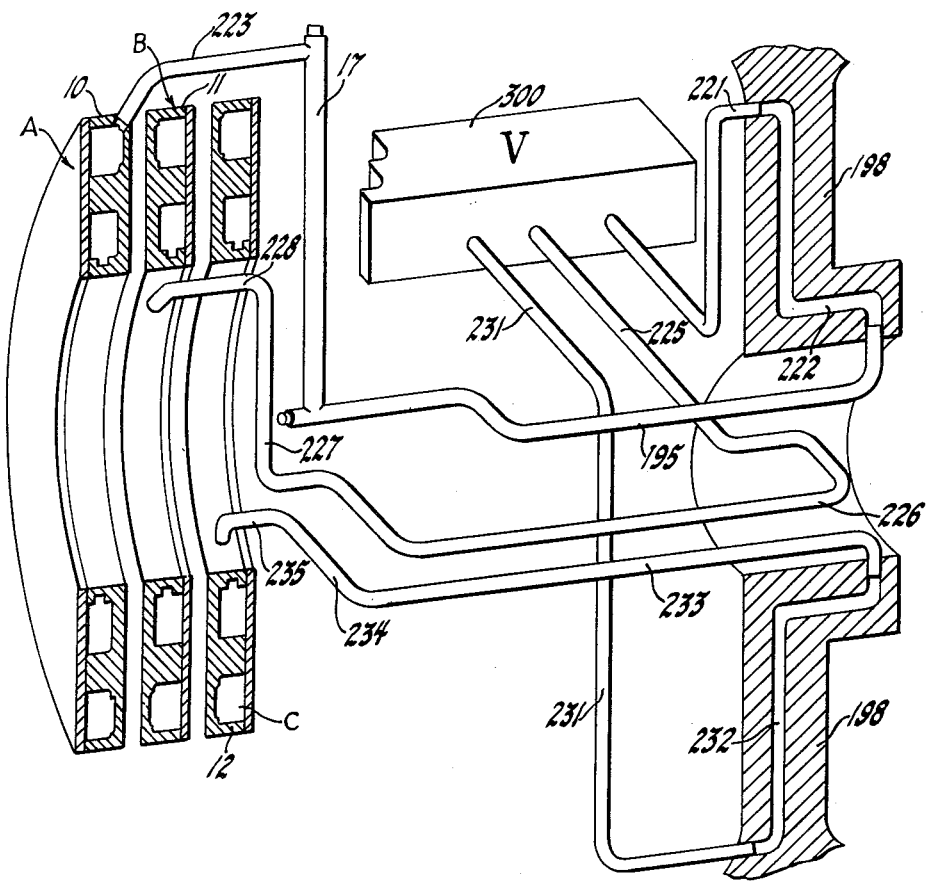
Fig. 4 is a schematic perspective view of the clutch servo supply passages in Fig. 1.

The engine flywheel 2 driven by shaft 1 drives torus cover drum 3 fixed to the impeller I of the fluid flywheel F. The flex-plate 2b is bolted to the end of shaft 1 and to the rim of flywheel 2. Cover 3a for rotor R is attached to drum 3.

The rotor R is attached to drum 5 through long sleeve 6. The drum 5 is flanged at 7, has web 8 and is formed to provide clutch cylinder recesses 10, 11, and 12 for pistons 14, 15 and 16.

The hub 19 of a clutch plate 20 is splined to shaft 30 on which a sun gear 35 is formed.

The hub 21 of a clutch plate 22 is splined to a hollow shaft 32 splined to a carrier 40 and a drum 41.

The clutch hub 23 for a plate 24 is splined to a shaft 33 of a sun gear 36, and shaft 33 is also splined to the sun gear 36 and which is fixed to drum 37.

The sun gear 35 meshes with a short planet gear 38 mounted on a spindle 42 of the carrier 40, the planet 38 meshing with a long planet gear 43, and also meshes with an annulus gear 45 splined on the shaft 50 which is the assembly output shaft. Long planets 43 are supported on spindles 44 in carrier 40.

The engine torque for all drive ratios is delivered by the fluid flywheel unit F, through coupling drums 3, 3a and 5.

The drum 37 of sun gear 36 is braked by brake

D and the carrier drum 41 is braked by the brake member E.

The three clutch plates 20, 22, 24 cooperating with flange 7, web 8 and pistons 14, 15 and 16, constitute three input coupling clutches, which are designated herein left-to-right, as A, B and C, for convenience.

There are five elements to be actuated, the three clutches A, B and C, and the two brakes D and E.

The following actuation table for the speed ratio actuation, for these actuable elements, the insignia X indicating the engaged or actuated members, is provided:

|              | A | B | C | D | E |
|--------------|---|---|---|---|---|
| Low          | X |   |   | X |   |
| 2nd          |   |   | X |   | X |
| 3rd          |   | X |   | X |   |
| 4th (direct) | X | X |   |   |   |
| Reverse      | X |   |   |   | X |

The above ratio sequence with a gear train of the present character is believed novel, for reasons explained further in this specification.

It is to be noted that the fluid flywheel unit F is located in a volumetric space separated from the engine by the compartment of the input driving drum 3, and the nesting of these units as shown represents a feature of constructional novelty not believed shown heretofore in this art.

Especial attention is directed to the arrangement of the carrier construction. The carrier member 40 is splined to shaft 32 and drum 41 is fixed to carrier 40 by spindles 42, the torque being transmitted by spindles 42 and corresponding registry pins, not shown. Drum 41 is extended laterally of the contact area for band E, for support against rocking couples by the housing ribs 202 and 203 and the bearing ring inserts 204 and 205. The band E lies in a housing channel 206 between the ribs 202 and 203. This feature contributes to maintenance of accurate alignment, the spindles 42 and 44 being supported on their outer axial extensions by the flange portions 40a and 40b of the web of carrier 40. The flanges 40a and 40b are removable from each other to promote ease of assembly.

The term "rocking couple" used herein is to describe the action of dissimilar forces generated at axially separated planar mesh zones of two gear groups of non-equivalent pitch lines.

The drum 3a at sleeve 3b thereof is keyed to primary pump gear 207 of pump P, and the output annulus gear 45 is keyed to the primary pump gear 208 of pump Q.

Figure 5:
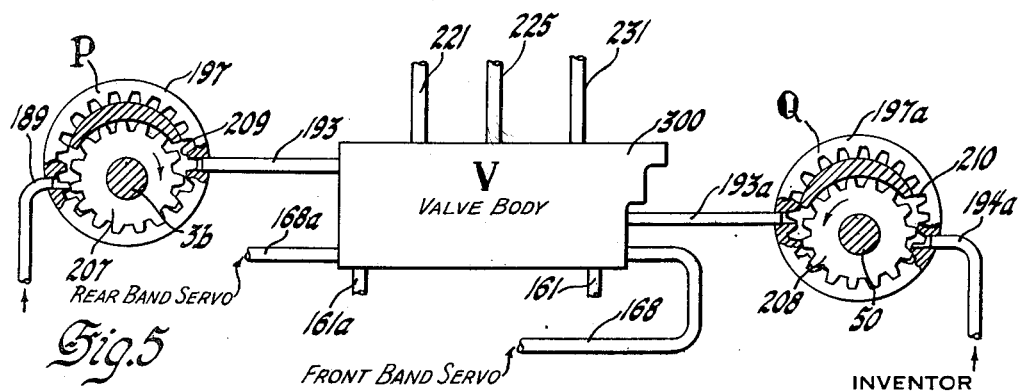
Fig. 5 is a diagram of the pump supply system and the control valving connections for the supply of the clutch and brake servo actuation devices of Figs. 1, 2, and 4.

The control arrangement for fluid pressure to actuate the bands D, E and the clutch pistons 14, 15 and 16, and the supply for maintaining the unit F filled, while furnishing lubrication pressure to the assembly, is provided by the two pumps P and Q, the drive connections assuring that under all operating conditions there will be an adequate supply of oil pressure as is customary in this art, and is discussed further in detail below. Master control valving such as indicated at "V" in Figs. 4 and 5 is arranged to direct servo supply pressure from the pumps P and Q of Figs. 1 and 5 to the servo passages for actuation to follow the preceding tabular pattern.

The nesting of the gear train and shafting is another important feature of the invention. The solid central shaft 30 is supported in pilot bearing 51, at the left, and in bearing 52 at the right.

The engine shaft 1 thru its supports, not shown, maintains right-angular relationship between pilot bearing 51 and the engine frame or casing 199 attached to the transmission casing 200.

The alignment of the shaft 33 of sun gear 36 is maintained by projecting axial flange 37a of drum 37 splined to shaft 33. Bearing reaction is taken on sleeve 200a which is fixed to casing 200.

Thrust washer bearings at a, b and c assist in the radial alignment of the clutch plate hubs 19, 21 and 23, shaft 33 being spaced from the web of carrier 40 by a similar washer d; while sun gear 35 is likewise spaced by bearings e and f, as shown.

The axial bearings g, h and i serve to support the alignment of the clutch hubs 19, 21 and 23 and the shafts 30, 32 and 33.

The carrier web 40 divides the compound gear unit into forward and rear portions, the long planet gears 43 only extending into both compartments. The forward compartment contains the reaction and coupling sun gear 36 meshing with planets 43, and the rear compartment contains the sun gear 35, planet gears 38 meshing with the long planet gears 43, and the annulus gear 45.

The ability of the unit to handle heavy reaction or band torques is in part due to the reference of the coupling forces to gear elements lying close to the shaft centerline. For example, in low gear sun gear 35 delivers the engine torque received by clutch A from drum 5 and the unit F. Reaction created by stopping of the sun gear 36 because of the applied brake to drum 37 causes secondary planet gears 43 to roll around gear 36 in the forward direction, the primary planet gear 38 revolving oppositely, the composite motion causing the annulus 45 to turn forwardly at a reduced ratio.

The drum 41 is supported to take the torque reaction for both 2nd speed ratio and reverse gear drive, the reaction reference point being the circle of rotation of the spindles 44 in the one case, and that of the spindles 42 in the other. These points likewise lie close to the shaft centerline.

In 3rd gear, engine torque is applied to clutch B, hub 21, shaft 32 and carrier 40, as the driver, the drive reaction being taken on sun gear 36.

It is of additional utility that the points of power application and delivery of the lower ratios that is, the largest torque multiplications, be coplanar wherever possible, as provided by sun gear 35, planets 38 and annulus 45. In a practical demonstration of the ratios made available by the invention herein, the following representative table is provided:

| | |
|---|---|
| Low | 3.95 |
| 2nd | 2.59 |
| 3rd | 1.62 |
| Direct | 1.00 |
| Reverse | 3.72 |

These figures merely show one calculated workout, and are variable in accordance with designer's desires, within reasonable dimensional limits of the parts to carry the torques for a given vehicle load and speed, as determined by the power of the engine.

The cylinders 10, 11 and 12 of the clutches A, B and C are filled thru passages connected individually to them, such as passage 17. The diagrams of Figs. 4 and 5 are believed sufficient for this showing, since the pressure delivery passages are connected in the same manner as passage 17 connects to cylinder 10, the connections leading to control valving V arranged to conform to the ratio actuation pattern given above. The passage 17, for example will deliver actuating oil to cylinder 10 for reverse, low gear and direct drive.

The web 198 of housing 200 is faced to act as a closure member for pump housing 197 for the gears 207, 209 of pump P. Coupling filling oil from the pump P passes forward along the inter-shaft space 196 between sleeve 3b of drum 3 and the sleeve 6 of drum 5, filling the working space of the fluid flywheel unit F. Drilled passages 195 thru sleeve 6 deliver actuating oil under positive pump pressure to the passage 17. Bushing 191 between shaft 33 and sleeve 6 permits lubrication oil to pass along the exterior of shaft 33. Leakage past bearings g, h and i is thrown toward plates 20, 22 and 24. Excess oil inside drum 5 is bled off thru passage 2a, the oil being picked up by flywheel 2 to be thrown into a pocket 180 in housing 199 connected to the sump by passage 181.

One novelty of this arrangement is the provision of partial pressure lubrication for the transmission elements, and maintenance of a relatively dry clutch compartment while affording lubrication of the clutch faces of the members within the compartment. In this, no running part is without lubrication, while any undesired centrifugal force effect on the oil body inside the clutch drum 5 is eliminated.

The pump P draws from the sump S thru a pipe 189 and delivers to a line 193 common with a similar line 193a leading from pump Q, as shown in Fig. 5, these lines feeding the unit F, the drum spaces noted above, and the passages 161, 161a, 168, 168a, also leading from ratio control valving V for servo actuation.

The rear pump Q driven by shaft 50 proportional to vehicle speed, draws from passage 194a connected to the sump, and delivers to passage 193a leading to a common connection in the valve body 300 with passage 193, so that whenever either pump is driven, the system is fluid pressure supplied, for all required purposes.

Since the two pumps P and Q are capable of furnishing a considerable pressure to the whole system at speeds above given shaft speeds, and since the compartment pressure within the drums 3 and 5 and in the working space of the fluid flywheel unit F is augmented by centrifugal force—it is desirable to relieve the pressures at a predetermined pressure value—therefore, a pressure reducer valve may be used in the valve body 300 to keep the fluid flywheel working space charged at a given pressure. It should be noted that lubrication pressure appears along the external face of shaft 30, that of shaft 32, and that of shaft 33, for assuring proper oiling of the gears of the gear train. Bushing 192 maintains alignment of sleeve 3b which is in abutment with slotted thrust washer 188 for centering the motion of the coupling elements.

At the fore part of the assembly, there is a measured quantity of oil available for passing along thru the splining of the hubs 19, 21, and 23, and it will be seen that no running part is without adequate lubrication. Seal 211 prevents loss of oil between drum 3 and housing 197. To stop such leakage from the fluid flywheel working space, the seal ring 211 is held against the adjacent machined face of the pump housing 197 by spring 211a. Seal 211 is keyed to sleeve 3b by pin 211b. The oil trapped by seal 211 is vented to the sump of the casing by passage 194.

It is believed novel to have the multi-clutch drum isolated from the fluid flywheel working chamber which is under pump pressure, and practise shows that there is less loss of power with less fluid drag if the clutch drum is set apart from the fluid flywheel chamber and the clutch drum interior kept dry while the working space is maintained under positive, unit pressure conditions.

It is not deemed necessary to show full details of control valves and valve bodies herein, in view of the state of the art. The control valving V in valve body 300, for example, may be of the general type of that shown in Letters Patent to Small and Nagel, U. S. 1,609,782 which issued December 7, 1926; of the type shown in U. S. 1,619,705 to A. E. L. Chorlton, which issued March 1, 1927, or like that shown in U. S. 1,673,863 to Brown which issued June 19, 1928.

The valve body 300 of Figs. 4 and 5 may contain the customary check valves and pressure regulator valves for enabling a continuous supply pressure to be made available for servo distribution by control valving V.

The additional Figures 4 and 5 are to show with greater clarity the fluid pressure actuator connections leading to the servo devices which operate the clutches A, B, C, and the brakes D and E. Figure 5 showing the general relationships between the master control valving of the valve body 300, the pressure connections to the clutch and brake servo cylinders and the two pumps P and Q which supply this system.

It will be noted that in Fig. 4 the cylinder 10 for actuator piston 14 of clutch A is shown supplied by conduit 223, and radial passage 17 joined to passage 195, the latter being radially connected through apertures shown in Figure 1 to delivery passage 222, which is shown connected to the valve body of Figures 4 and 5, at 221.

Similarly, the cylinder 11 for clutch B in Fig. 4 is connected by conduit 228 joined to equivalent radial passage 227 connected axially to passage 226 which is, in turn, joined to the passage 225 connected to the distributor valve body 300 of Figures 4 and 5.

In the same manner, the clutch cylinder 12 for clutch C is connected by conduit 235 joined to radial passage 234 which is connected longitudinally by passage 233, the latter, in turn, being connected to the housing passage 232, shown to be joined to the valve body 300, at 231.

The front pump P draws its fluid supply from sump passage 189, and delivers to passage 193, connected to the valve body 300, which may have in the pump connections the customary over-pressure relief valve and the check valves now common to dual pump supply systems.

As shown in Figure 5, the pressure connections 193, 193a of pumps P and Q are the supply lines for the valve body 300.

The drive operation of the vehicle equipped with the invention is initiated with the starting of the engine, pump P quickly filling the fluid flywheel and lubricating spaces, as stated above.

In Fig. 2 brake band E is seen to have an anchor end 150 bearing against a ledge of the housing 200, and a movable end pivoted to an arm 151 at 152, the arm terminating in a formed end, bearing in notch 153 of lever 154 pivoted on the housing at 155.

The two-piece brake cylinder 160 is fastened to the casing and is connected by a passage 161 with the fluid control and actuation pressure lines, the piston 165 having rod 166 engaging the end of lever 154, and equipped with a retracting spring 167. Admission of pressure by passage 161 builds up pressure on the smaller diameter portion of the piston 165, and admission by passage 168, builds up pressure on the larger diameter portion of piston 165. Release of the pressures permits spring 167 to release band E.

Similarly, band D is operated by approximately identical mechanism.

None of the clutches or brakes are actuated under neutral control conditions. If the idling speed of the impeller I is high enough to spin the rotor R, the drum 5 and connected parts merely rotate idly. Application of fluid pressure to actuate brake D, with delivery of pressure to cylinder 10 establishes low gear reaction by sun gear 36, and connects the engine to drum 5 thru the fluid flywheel F. As engine speed rises, the torque capacity of the unit F increases, and the shaft 50 is driven in low gear.

Release of pressure in cylinder 10 with application of pressure in cylinder 12 to piston 16 connects the engine torque to sun gear 36 which had been stopped for low gear, and simultaneous release of brake D and application of fluid pressure to brake E establishes reaction on carrier 40; for drive of shaft 50 at 2nd, speed ratio.

For 3rd, gear drive, piston 16 is relieved of pressure and piston 15 energised, while band E is released and band D again loaded by pressure.

For obtaining high or direct drive, clutch B is held or kept energised, brake D is released and clutch A brought to engagement by pressure applied to piston 14.

Under these driving conditions, a locking couple is provided in the gearbox between the sun gear 36 and carrier 40 due to the common drive of the clutches A and B by the drum 5, hence the gear train cannot have internal differential rotation, and the annulus gear is required to rotate at unit speed with shafts 30 and 32.

If desired for control purposes, all three clutches A, B and C may be energised for drive in direct, enabling the designer to correlate the release of clutch C with energising of band D, to obtain downshift to 3rd, speed ratio.

The invention arrangement provides exceptionally easy shift between low and reverse gear drive thru the simple alternation of actuation of bands D and E, clutch A being connected to the engine for both ratio drives.

To obtain reverse gear drive, the clutch A is connected to drum 5. This applies forward rotation to the shaft 30 and sun gear 35 meshed with the planet gears 38. Drum 41 of the carrier 40 is stopped by brake E. Retrograde rotation of the planets 38 on their stopped centers is transmitted to the meshed annulus gear 45 fixed to the output shaft 50.

In normal operation, the pressure to actuate piston 14 of clutch A is directed by the control valving V to passage 221 in the casing 198, passage 222, passage 195 in the rotating sleeve 196 of the drum 5, radial passage 17 in the wall 8 of the drum 5 and by lateral conduit 223 to the cylinder 10.

Piston 15 of clutch B is actuated by pressure directed by the control valving V to passage 225 in the casing 198, passage 226 in the rotating sleeve 196, radial passage 227 in the wall 8 of the drum 5, and by lateral conduit 228 to the cylinder 11.

Similarly, piston 16 of clutch C is pressure-actuated by pressure directed from the valving V to passages 231, 232 in the casing 198, passage 233 in the sleeve, radial passage 234 in the wall 8 of drum 5 and by lateral conduit 235 to cylinder 12.

In Fig. 5 servo pressure distribution is by the passage 168 which supplies normal servo pressure to actuate brake E of Fig. 1 and passage 161 supplying reinforcing pressure for same. Similarly, the passages 168a and 161a furnish equivalent operational pressures for the servo mechanism of brake D not shown—as directed by control valving V located in valve body 300.

The valve pattern of servo actuation control to follow the ratio table given above, is:

*Pressure supply lines*

|  | A-221 | B-225 | C-231 | D-161a | E-161 |
|---|---|---|---|---|---|
| Low | X |  |  | X | X |
| 2nd |  |  | X | X | X |
| 3rd |  | X | X |  |  |
| Direct | X | X |  |  |  |
| Reverse | X |  |  |  | X |

The valving may be arranged for rapid shift by the operator, thru a neutral position of the control such that clutch A tends to remain partially loaded by the pressure in cylinder 10 on piston 14 due to the fact that a longer time interval is required to empty and refill the cylinder than that for alternating the brake actuation.

This feature enables the designer to utilize control means for the low-and-reverse valving of extremely simple type, thus providing the vehicle driver with the means to rock a car out of a muddy or low-traction icy location, which is a desirable feature.

The applicant has disclosed herein a drive structure believed novel in the special arrangement of the planetary gearing in particular, the present method of compounding two sun gears, two meshing planet gears, a carrier and an output annulus gear with three input clutches, with the input clutch drum being driven thru a fluid flywheel. It is therefore believed broadly new to combine the stated elements of the gear train shown herewith in the arrangement which includes the three input clutches, and also the combination of the fluid flywheel as the primary torque delivery unit of the train.

The present arrangement provides a compound planetary gear train having a primary sun gear coupled to engine torque for both low and reverse, in which the carrier member of meshed double-planet gears is stopped for reverse, and in which the secondary sun gear is stopped for low gear reaction, the overall output torque being delivered by an annulus gear driven by the planet gears meshed with the primary sun gear.

The specification herein has shown in detail the particular features of the planetary gear train combined with plural input clutches, with a primary fluid drive unit, and yielding 4 speeds forward and reverse by predetermined actuation of selected clutches and brakes in accordance with a drive pattern including individual and multiple clutch actuation but singular actuation of one of two reaction brakes for any ratio other than forward direct.

The advantages entailing from the compartmenting of the units described, the nesting of the gearing and the support of the multiple shafting required, are believed obvious to one skilled in the art.

The invention is subject to equivalent part in substitution and to departures from the specific embodiment disclosed herein, but the principles and features explained and taught are susceptible of numerous other variations which will occur to those persons skilled in the art and therefore it is intended that the invention for which protection is sought shall be limited only as stated in the scope of the appended claims.

What is claimed is:

1. In a power transmission for vehicle drives, an engine, an output shaft, a compound planetary gear unit for coupling said engine and shaft having a carrier for two intermeshing planet gears, said carrier being equipped with a brake drum and a clutch plate shaft, a first sung gear meshing with one of said planet gears and having a clutch plate shaft, an annulus gear meshing with said planet gear and attached to said output shaft, a second sung gear meshing with the other of said intermeshing planet gears having a brake drum and attached to a clutch shaft, a clutch drum adapted to be driven by said engine, a clutch plate attached to each of said clutch shafts, said clutch plates being located adjacent each other within said clutch drum, selectively actuable gripping means mounted in said clutch drum for causing said clutch plates to rotate with the clutch drum individually or conjointly, brakes for said carrier drum and said second sun gear brake drum, and actuating means for said gripping means and said brakes operable to provide selected speed ratios of drive of said output shaft by said gear unit.

2. In the combination set forth in claim 1, the sub-combination of a fluid pressure supply system for providing actuation of said clutch gripping means and of said brakes consisting of two pumps, one driven by said engine and the other by said output shaft, of fluid pressure pistons housed in cylinders formed in said clutch drum and of control valving and passages connecting said pumps and said cylinders operable upon said gripping means and said brakes to establish said selected speed ratios of drive of said output shaft by said gear unit.

3. In step ratio gearing, a transmission casing, a compound planetary gear unit mounted in said casing, said unit having planet gears on spindles supported by a carrier, an output shaft with a gear meshing with one of said planet gears, a plurality of sun gears meshing with said planet gears, one of said sun gears having a reaction brake drum and a bearing flange, a brake drum for said carrier having axially extended portions, a radial web of said casing extending inward and having a bearing coacting with said flange, a pair of circumferential ribs formed inside said casing spaced apart to register with the axially extending portions of said carrier drum, and a pair of anti-friction rings fitted inside said ribs and operable to provide relatively large-diameter bearings between the ribs and carrier drum portions so as to curtail misalignment of said drum under rocking torque couples generated by different torques applied to the gears of said unit.

4. In power transmission devices, an engine, a casing, a radial web on said casing, a drive transmitting arrangement within said casing comprising a plurality of nested shafts including a central shaft, a plurality of hollow shafts surrounding the central shaft and having an outermost hollow shaft driven by said engine, lubricant flow spaces between the said shafts, a pump having an idling gear and a driving gear, a cover for said pump cooperating with a portion of said web to form a pump housing for said gears, a pressure delivery port for said pump, a bearing between said cover and said outermost hollow shaft, a connection between said outermost hollow shaft and said pump driving gear for driving the said pump, a lubricant flow space of said spaces lying within said outermost hollow shaft and connected to said port; and a sealing device for preventing leakage from said bearing consisting of an axially movable member with a radial face bearing endwise against said cover, a key for connecting said member to rotate with said outermost hollow shaft, and force-applying means acting to maintain endwise pressure of said member against said cover during rotation of said outermost hollow shaft.

5. In the combination set forth in claim 4, the subcombination of a driving drum attached to said outermost hollow shaft the interior of said drum acting as a pressure delivery space, and of a pressure outflow passage connected to said space formed by a second inter-shaft flow space between shafts within said outer hollow shaft.

6. In power transmissions, an engine, an output shaft, a compound planetary gear assembly consisting of primary sun gear, a carrier, a first planet gear meshed with said sun gear and meshing with a second planet gear, both planet gears being supported by the carrier, an annulus gear meshing with the said first planet gear and attached to rotate with said output shaft, a clutch plate and central shaft connected to said primary sun gear, a clutch plate and hollow shaft surrounding said central shaft and attached to said carrier, a third clutch plate and hollow shaft surrounding said central and said first hollow shafts, the third clutch plate shaft being attached to said secondary sun gear, a driving drum driven by said engine and adapted to be coupled to said clutch plates in selected patterns for providing a sequence of speed ratio drives of said output shaft, brake means for said hollow shafts of said second and third named clutch plates and actuation means operative to engage said plates with said drum and energise said brake means for providing four forward speed ratios and one reverse speed ration for said output shaft.

7. In the combination set forth in claim 6, the sub-combination of a fluid flywheel, an engine connected drum enclosing said clutch drum and connected thru said fluid flywheel to drive said drum, and fluid pressure supply means driven by said engine for maintaining positive fluid pressure within the fluid working space of said fluid flywheel.

8. In the combination set forth in claim 6, the sub-combination of a fluid flywheel having input and output members, an engine connected drum adapted to drive the said input member and enclosing said clutch drum, fluid pressure supply means connected to maintain fluid pressure within the working space of said fluid flywheel, and compartmenting means separating the fluid space of said clutch drum from that of said fluid flywheel.

9. In the combination set forth in claim 6, the sub-combination of a fluid pressure supply means for providing actuation of said actuation means consisting of pumps driven by rotation of said engine and said output shaft, of a plurality of servo pistons and cylinders, one set for each of said actuation means, and of valving and pressure feed passages leading to said cylinders wherein said valving is effective in one range of settings to establish a plurality of selected drive ratios by selective application of the fluid pressure of said pumps to said cylinders for operating said pistons and in another setting effective to establish said reverse drive ratio by selective application of the said fluid pressure to two of said cylinders, one of which contains a piston for actuating one of said clutches and the other of which contains a piston for actuating one of said brake means.

10. In power transmissions, an engine, an output shaft, an assembly consisting of a planetary gearing unit having a plurality of step-ratio elements arranged to transmit both forward and reverse drive to said output shaft, a group of three nested clutch plates with concentric shafts each connected to separate gear train elements of said unit and operative to provide forward and reverse drive therewith, a driving drum for said clutch plates drivable by said engine, the clutch drum being formed to provide three axially spaced servo cylinders and three clutch backing plates, pistons in said cylinders adapted to move axially for direct cooperation with the backing plates for gripping each of said clutch plates, a driving collar for said drum connected thereto by a radial web, three continuing feed passages in said web, in said drum and in said collar, and each one connected one to each of said cylinders, a casing for said assembly, a radial web in said casing arranged to register with portions of said passages lying in said collar, three feed passages in said radial web each connecting to one of said collar passages, fluid pressure pump means driven by rotation of said engine and by said output shaft for furnishing clutch actuating pressure to said passages, and fluid pressure supply control means made selectively effective to provide clutch energizing pressure for said pistons, individually in accordance with a predetermined forward and reverse reduction ratio drive selection of said gear unit, and to two of said pistons for providing direct drive between said engine and said shaft, said supply control means consisting of pressure directing control means effective in one group of settings to direct said pressure individually to said clutch feed passages one at a time for providing forward drive at one of three reduction speed ratios, reverse drive at one reduction ratio in a different setting, and operative to direct the said pressure simultaneously to two of the said clutch feed passages for providing the said direct drive in a third setting of said pressure-directing control means.

11. In the combination set forth in claim 10, the subcombination of said gearing unit being of planetary form and having reaction brake means connected to at least two of the said clutch plates for stopping rotation thereof, of fluid pressure energised servo devices for operating said brake means consisting each of a piston and cylinder, and of connections with the said fluid pressure supply means for conjoint operation with that of the said clutch pistons in order to establish gear reaction in said unit by the elements connected to the said two clutch plates when said elements are not being coupled by their clutch plates to said clutch drum.

12. In the combination set forth in claim 10, the sub-combination of a fluid pressure servo and ratio control system adapted to provide fluid pressure to said supply control means consisting of said pump means and said control system embodying fluid pressure delivery passages directly connecting the outputs of said pump means to said pressure-directing control means, said system including an arrangement of said first and said second-named passages with respect to said pressure-directing control means, said arrangement being operative to establish said predetermined ratio drive selecting sequence by said means being operative to direct the pressure of said pumps from said delivery passages directly to said feed passages so as to cause actuation of said three clutch pistons one at a time in one range of operation of said pressure-directing control means and to cause final actuation of at least two of said pistons in response to a separate setting of said latter control means, said range operation establishing said reduction ratio drive sequence of said gear unit and said final actuation establishing the said direct drive.

13. In the combination set forth in claim 10, the subcombination of a fluid flywheel unit having an impeller driven by said engine and a rotor connected to said clutch driving drum, of said fluid pressure supply means being made operative by rotation of said engine and said output shaft, and of a connection from said supply means for maintaining said fluid flywheel unit filled under positive fluid pressure during the drive operation of said assembly.

14. A transmission assembly adapted to provide four forward and one reverse drive ratio between input and output shafts, consisting of an annulus gear connected to said output shaft, of a carrier supporting intermeshing planet gears one of which meshes with said annulus gear, of a primary sun gear meshing with the planet gear which meshes with the said annulus gear, of a secondary sun gear meshing with the other planet gear, a clutch drum adapted to be coupled to said input shaft, a plurality of clutch plates arranged to be coupled selectively to said drum, said plates being connected to said sun gears and said carrier, a brake drum for stopping rotation of said carrier, a second brake drum for stopping rotation of said secondary sun gear, and selectively operable actuator means for engaging said clutch plates with said clutch drum and for stopping said brake drums in predetermined patterns of actuation for providing the said four forward ratios and the said one reverse speed ratio of drive between said shafts.

15. In the combination set forth in claim 14, the subcombination of a fluid flywheel unit having an impeller and a driven rotor and of connections for same coupling said impeller to said input shaft and coupling said rotor to said clutch drum.

16. In power transmissions, an engine shaft, a load shaft, a planetary gear unit adapted to transmit variable torque between said shafts and having three input members connected to separate trains of said unit, a fluid flywheel consisting of an impeller driven by said engine shaft and a rotor, a clutch driving drum connected to said rotor and containing gripping members adapted to clutch to said input members selectively, reaction elements for said unit and gripping members for same adapted to hold said elements selectively against rotation, a fluid pressure system supplied by pumps driven by said shafts with actuators for said gripping members and having selective valving delivering the pressure of said system to said actuators, and a particular arrangement of said input members wherein for one predetermined ratio of drive one of said input members is combined with one of said reaction elements and is prevented from rotation by one of said reaction element gripping members, and wherein for another predetermined ratio of drive a second of said input members is likewise combined with a second of said reaction elements and is prevented from rotation by another of said reaction element gripping members.

17. In power transmissions, the combination of driving and driven shafts, a power transmission comprising a multiple clutch drum, a fluid flywheel and a compound planetary gear unit having a single carrier arranged in the stated order between said shafts, a particular arrangement of the gears of said unit consisting of three input members, an output member fixed to said driven shaft, and having reaction brake actuators for two of said input members for the purpose of providing selected drive ratios between said shafts, mechanism within said drum for selective clutching of said input members to said drum for the purpose of providing selected drive ratios between said shafts, said mechanism and said actuators being conjointly operable, and control devices for said mechanism and said actuators operable to provide four forward speed ratios and one reverse speed ratio of drive between said shafts by selective operation of the said mechanism and said actuators.

MILTON H. SCHEITER.

References Cited in the file of this patent

UNITED STATES PATENTS

| Number | Name | Date |
|---|---|---|
| 752,953 | Brush | Feb. 23, 1904 |
| 944,597 | Brush | Dec. 28, 1909 |
| 1,256,371 | Rowledge | Feb. 12, 1918 |
| 2,143,321 | Kegresse | Jan. 10, 1939 |
| 2,150,950 | Thoma | May 21, 1939 |
| 2,220,174 | Ravigneaux | Nov. 5, 1940 |
| 2,282,591 | Orr | May 12, 1942 |
| 2,332,593 | Nutt et al. | Oct. 26, 1943 |
| 2,347,882 | Choate et al. | May 2, 1944 |
| 2,353,905 | Kelley | July 18, 1944 |
| 2,395,459 | Carnagua | Feb. 26, 1946 |
| 2,397,368 | Pennington | Mar. 26, 1946 |
| 2,407,289 | La Brie | Sept. 10, 1946 |
| 2,466,320 | Lawrence | Apr. 5, 1949 |

FOREIGN PATENTS

| Number | Country | Date |
|---|---|---|
| 48,019 | France | Oct. 16, 1937 |
|  | (Addition to No. 809,102) |  |
| 528,084 | France | Aug. 9, 1921 |